Jan. 11, 1966   D. S. CVACHO ETAL   3,228,272
METHOD AND APPARATUS FOR BENDING AND CUTTING A
PARTIALLY SLITTED LONG TUBE TO PRODUCE
A PLURALITY OF RELATIVELY
SHORT TUBES
Filed Jan. 18, 1963   6 Sheets-Sheet 3

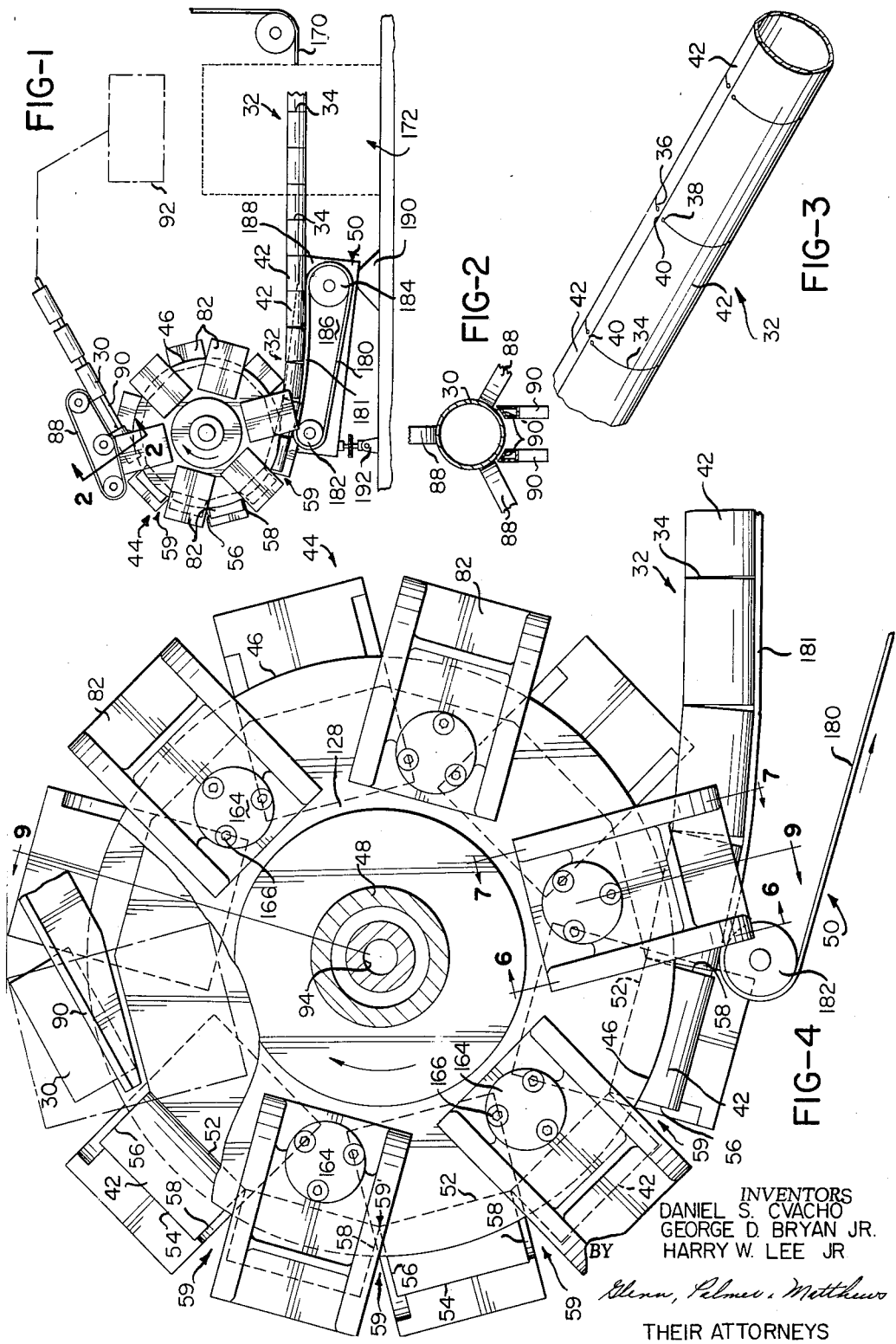

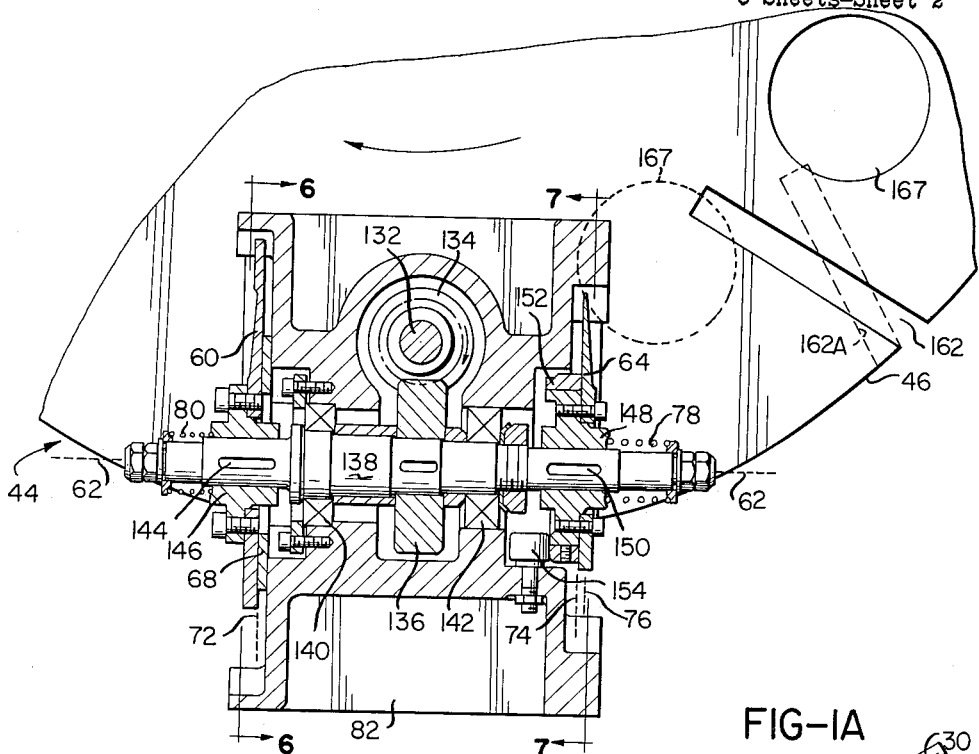
FIG-5
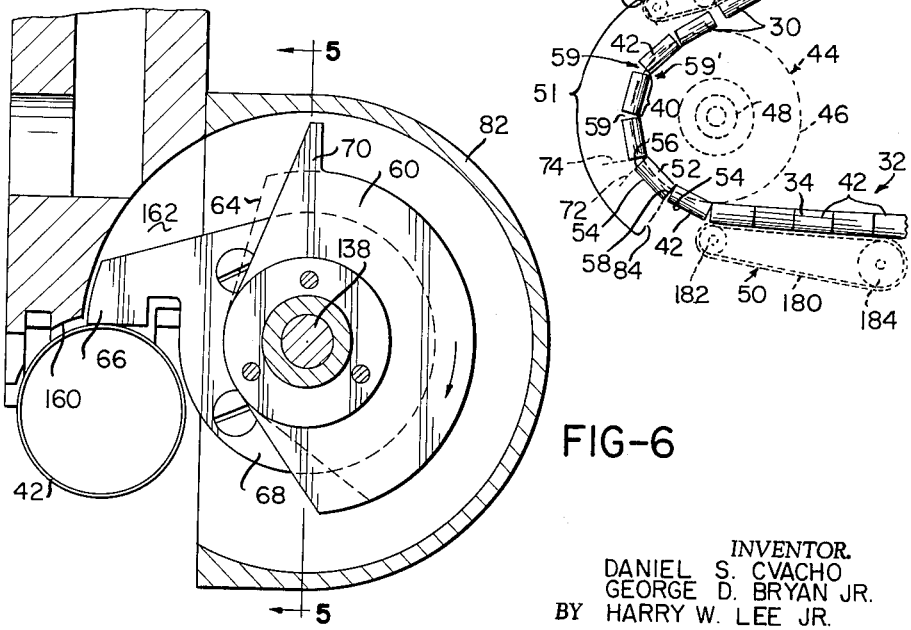
FIG-1A
FIG-6

INVENTOR.
DANIEL S. CVACHO
GEORGE D. BRYAN JR.
BY HARRY W. LEE JR.

THEIR ATTORNEYS

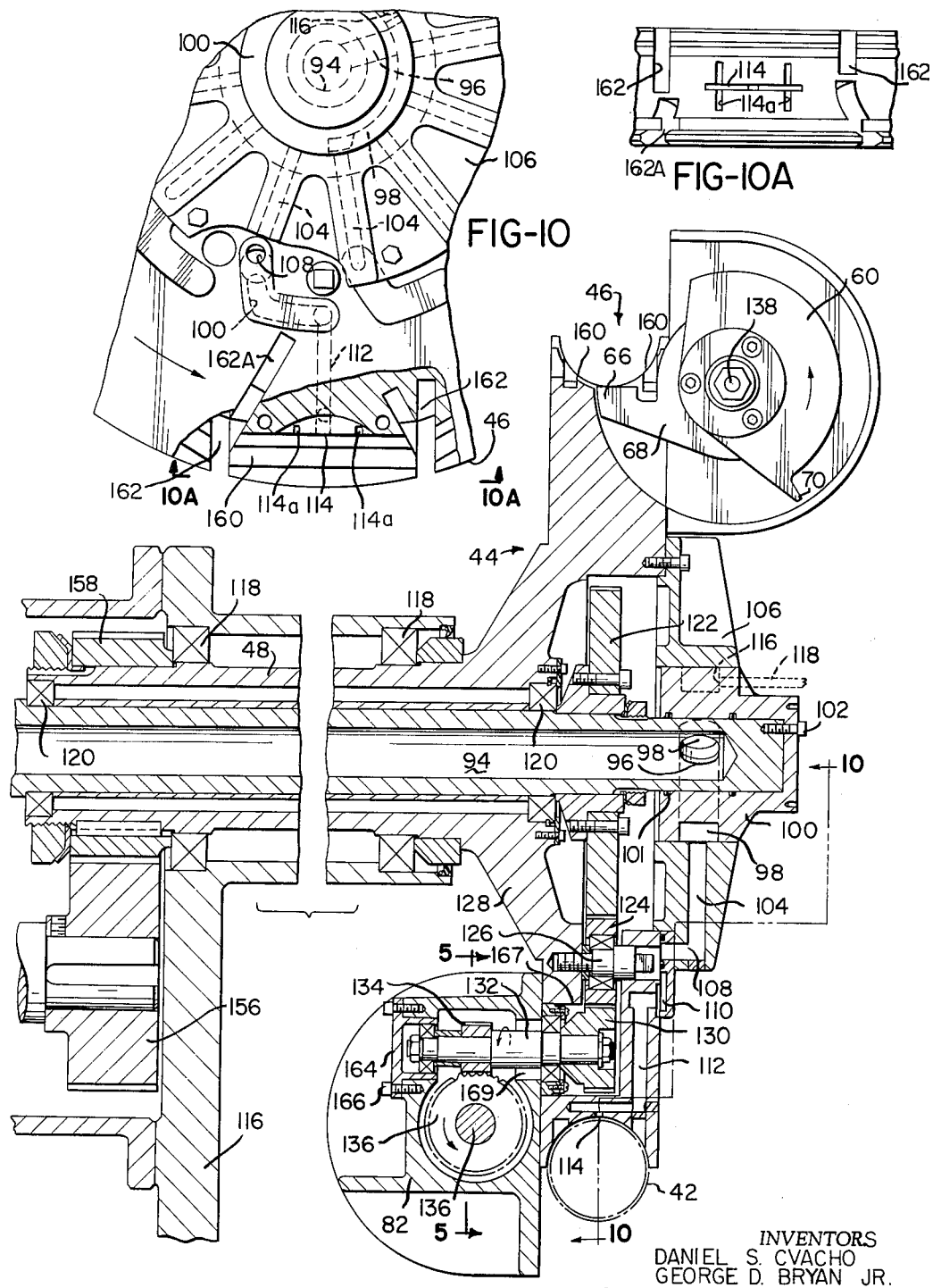

United States Patent Office 3,228,272
Patented Jan. 11, 1966

3,228,272
METHOD AND APPARATUS FOR BENDING AND CUTTING A PARTIALLY SLITTED LONG TUBE TO PRODUCE A PLURALITY OF RELATIVELY SHORT TUBES
Daniel S. Cvacho, Chesterfield County, George D. Bryan, Jr., Ellerson, and Harry W. Lee, Jr., Chesterfield County, Va., assignors to Reynolds Metals Company, Richmond, Va., a corporation of Delaware
Filed Jan. 18, 1963, Ser. No. 252,345
10 Claims. (Cl. 83—37)

This invention relates to an improved method and apparatus for bending and cutting a partially slitted long tube to produce a plurality of relatively short tubes. The short tubes may be used for a variety of purposes, such as for the manufacture of cans or other containers and the like.

One of the features of this invention is to provide an improved method and/or apparatus for completely severing relatively short tubes from a relatively long tube which long tube has a plurality of transverse slits extending to and terminating at both edges of an uncut longitudinal strip of said tube, which strip holds together a series of partially severed, relatively short tubes which form the long tube.

Another feature of this invention includes the feeding and bending of such a long tube around a portion of the periphery of a rotating wheel with the uncut longitudinal strip forming the inner part of a polygonal arch formed by the straight sides of said short tubes with the ends of adjacent short tubes diverging from each other. The adjacent ends of such short tubes form diverging angles with apexes where the uncut longitudinal strip is to be cut by rotating cutting knives. One or more of such rotating cutting knives are carried by the wheel and each knife is rotated completely around an axis parallel to a respective adjacent short tube with said knife rotating adjacent the leading end of such adjacent short tube so the knife cuts the longitudinal strip adjacent the leading end, completely to sever, from such long tube, the forward short tube which is immediately forward of such adjacent short tube.

Another feature of this invention includes the provision of means for automatically aligning the knife or knives with the portion of the longitudinal strip of the long tube which connects the adjacent short tube with the forward short tube which is to be cut from such adjacent short tube.

According to another feature, a disc, or discs or flat surface member or members each simultaneously rotate about the axis or the axes adjacent the trailing end or ends of the adjacent short tube or tubes. The construction is such that the knife or knives are automatically aligned with the portion of uncut strip which joins the adjacent tube and the forward tube at the time of the cutting of the longitudinal strip.

Another feature of the invention includes the use of vacuum means to hold the short tubes against the periphery of the wheel.

Another feature includes the use of air under pressure to discharge the tubes from the wheel to a discharge conveyor after they have been cut from the long tube.

Another feature of this invention is to provide feeding means to feed a portion of the long tube in the form of a depending span with one end of the span adjacent the periphery of the wheel, so the depending span by variation in its sag may compensate for a slight relative forward movement of the long tube with respect to the periphery of the wheel to provide the proper alignment of the cutting knives with the portion of the strip to be cut by the knives.

Another feature of this invention is the provision of automatic means slightly to advance the relatively long tube with respect to the periphery of the wheel properly to align the knives with the portions of the longitudinal strip which are to be cut by the knives.

Accordingly, it is an object of this invention to provide a method having one or more of the features herein disclosed.

Another object of this invention is to provide apparatus having one or more of the features herein disclosed.

Other objects are apparent from this description, the appended claimed subject matter, and/or the accompanying drawings, in which:

FIGURE 1 is a diagrammatic, side elevation, disclosing a method and apparatus for producing a relatively long tube and for cutting such long tube into relatively short tubes.

FIGURE 1A is a diagrammatic view somewhat similar to FIGURE 1, but omitting some structural features.

FIGURE 2 is a cross section along the line 2—2 of FIGURE 1.

FIGURE 3 is a diagrammatic perspective view of a portion of the long tube.

FIGURE 4 is a diagrammatic side view of the wheel construction used in severing the relatively long tube.

FIGURE 5 is a cross section, for example, along line 5—5 of FIGURES 6 and 9 and showing rotating knife and disc constructions which are provided at different stations around the periphery of the wheel.

FIGURE 6 is a cross section along the line 6—6 of FIGURES 4 and 5.

FIGURE 9 is a cross-sectional view generally along the line 9—9, FIGURE 4.

FIGURE 10 is a cross-sectional view along the line 10—10 of FIGURE 9.

FIGURE 10A is a view along line 10A—10A of FIGURE 10.

Figure 8:
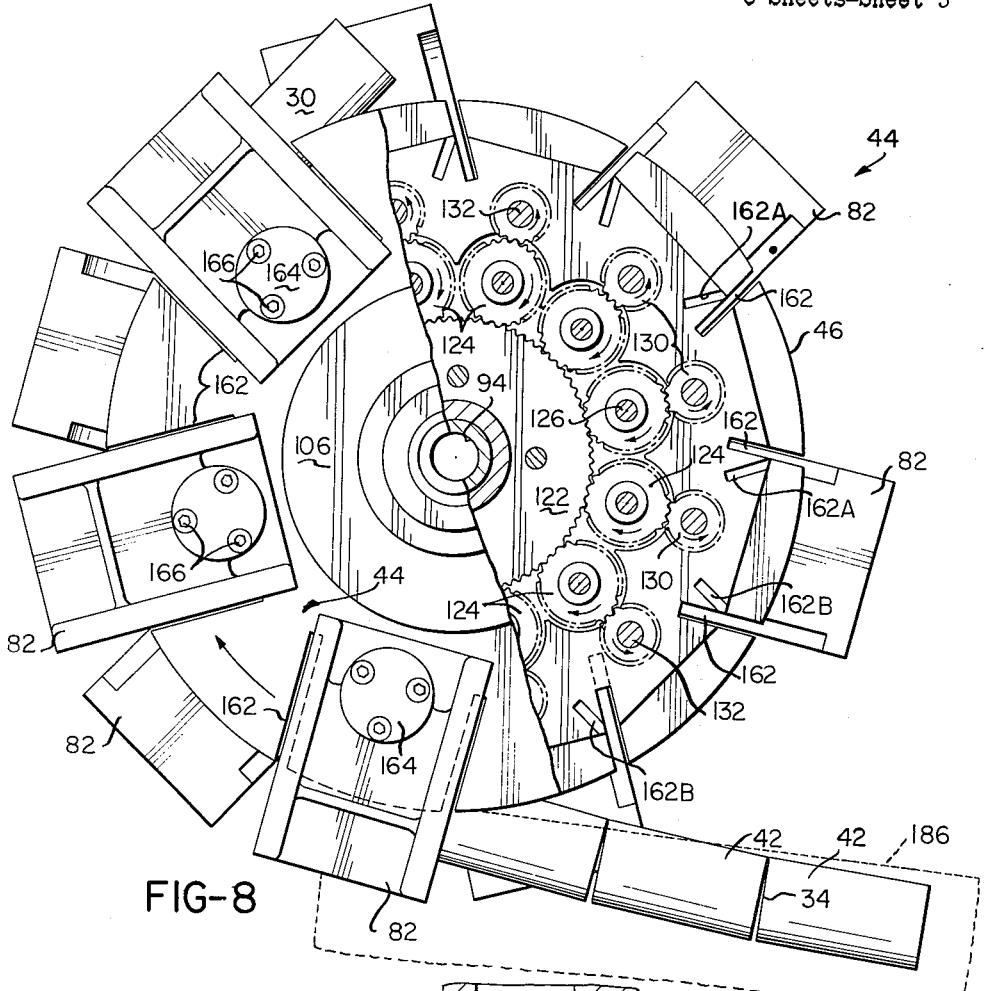
FIGURE 8 is a view somewhat similar to FIGURE 4, but showing certain parts broken away for the disclosure of internal constructions.
Figure 7:
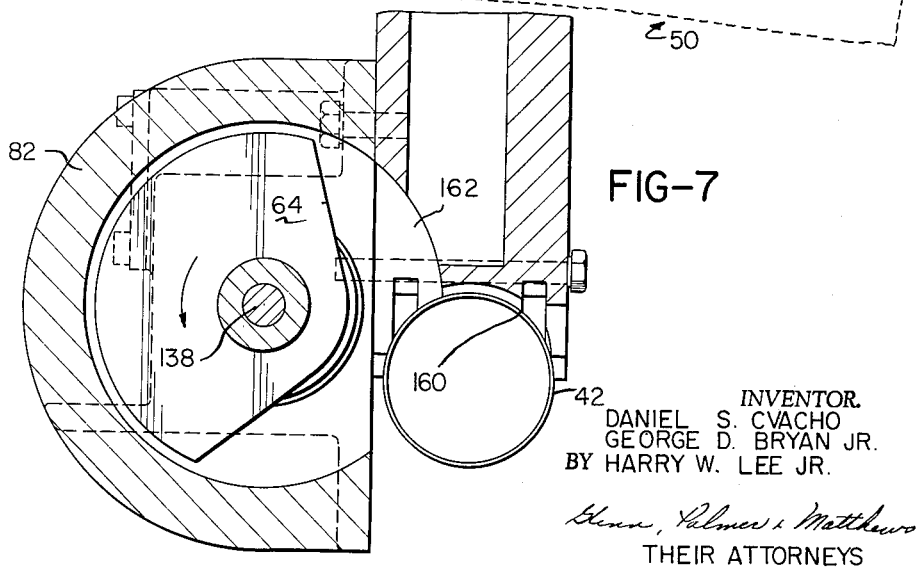
FIGURE 7 is a cross section along the line 7—7 of FIGURES 4 and 5.

FIGURES 1 and 1A show a method and apparatus for completely severing relatively short tubes 30, from a relatively long tube 32 which tube has a plurality of transverse slits 34 extending to and terminating at both edges 36 and 38 of an uncut longitudinal strip 40 of the tube 32. The strip 40 holds together a series of partially severed, relatively short tubes 42, which form the relatively long tube 32.

A wheel 44 has a periphery 46 to receive the relatively long tube 32.

Means for rotating and supporting the wheel 44 may include a hollow rotatable shaft 48.

Means may be provided for feeding and bending the long tube 32 around a portion of the periphery 46 of such wheel, while the wheel is rotating. The long tube 32 may be fed to the wheel 44 by the conveyor means 50.

The portion of the long tube which is fed and bent around a portion of the periphery may be so fed and bent as to cause the longitudinal strip 40 of the tube 32 to form the inner part of a polygonal arch (which is subtended by bracket 51, FIGURE 1A) with the uncut longitudinal strip 40 forming the inner part 52 of the arch, and the arch being formed by the straight sides 54 and 52 of the short tubes within the bracket 51.

The leading ends 56 and the trailing ends 58 of adjacent short tubes 42, FIGURE 4, may diverge from each other to form angles 59 while they are on the arch 51 portion of the periphery 46 of the wheel.

A cutting knife 60 is carried by the wheel 44 and has means, elsewhere described, completely to rotate such knife around an axis 62, FIGURE 5, parallel to an adjacent short tube 42, not shown in FIGURE 5, with said knife rotating adjacent the leading end 56 of said adjacent short tube. The knife 60 will cut, at the correct time, as elsewhere disclosed, the longitudinal strip 40 of long tube 32 adjacent the leading end 56 of the short tube completely to sever from the long tube 32 the forward short tube 30, FIGURE 1A, which is immediately forward of the adjacent short tube 42.

A disc or flat surfaced member 64 has means simultaneously to rotate such disc with the knife 60 about the axis 62 and adjacent the trailing end 58 of such adjacent short tube.

The construction of the knife or knives 60 with their cooperating disc or discs 64, as they are distributed around the wheel 44, provides means automatically to align the respective knife 60 with the portion of the longitudinal strip 40 of tube 32 which connects the adjacent short tube 42 with the forward short tube 30 immediately forward of such adjacent short tube at position 86, FIGURE 1A, to provide a clean cut between adjacent short tube 42 and the forward tube 30 at the proper time.

There is a stationary cutting blade or anvil 66, FIGURES 6 and 9, which is carried by a stationery disc or flat surfaced member 68, which cooperates with the cutting blade 70 of cutting knife 60. The rotating blade 70 and the stationary blade 66 are so constructed that they shear the uncut strip 40 at the plane 72, FIGURE 5, which is also the plane of the leading edge or end 56 of the respective uncut short tube 42. The plane 72 is indicated also in FIGURE 1A.

However, there are a plurality of pairs of knife members 60 and discs 64 distributed around the wheel 44. These pairs preferably are distributed alternatively on both sides of the wheel in order to place them closely together.

Figure 12:
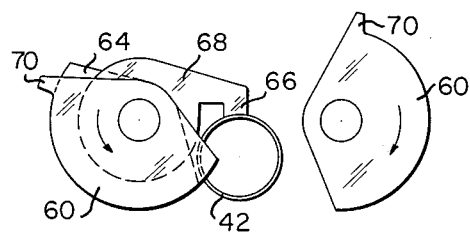
Figure 13:
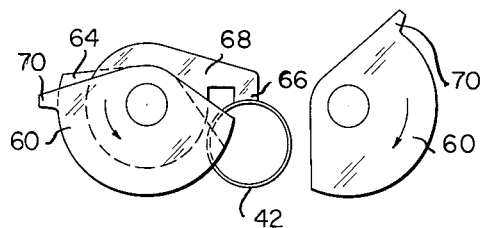
Figure 14:
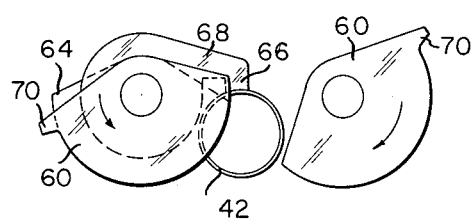
Figure 15:
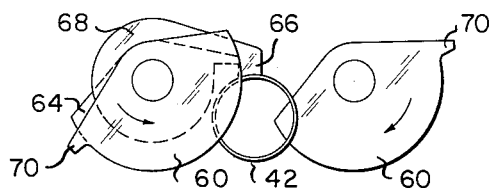
Figure 16:
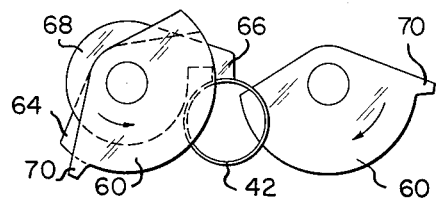
Figure 17:
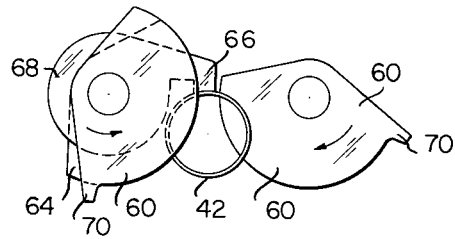
Figure 18:
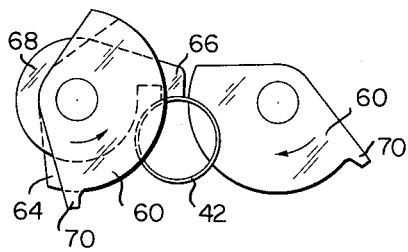
Figure 19:
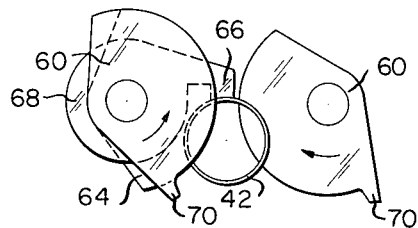
Figure 20:
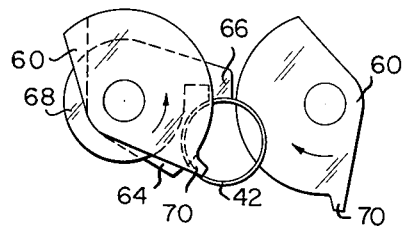
Figure 21:
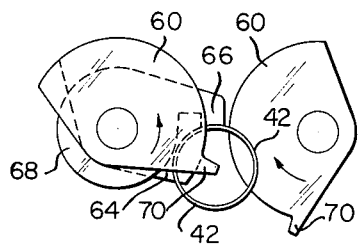
Figure 22:
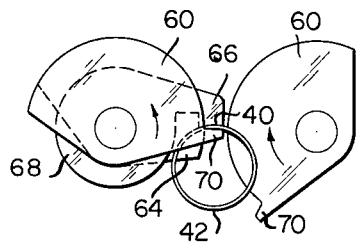

The knife members 60 and discs 64 are placed in the diverging angles 59 near the position 84, FIGURES 1A, as shown in FIGURES 12 and 13, and the cutting action takes place near position 86, FIGURE 1A, as is about to occur in FIGURE 22.

Each rotating disc 64 tends to push the trailing end 58 of a respective short tube 42 to coincide with the plane 74, FIGURES 5 and 1A.

The rotating disc 64 tends to push the trailing end of the respective short tube 42 to coincide with the plane 74, if for any reason the trailing end 58 should have been displaced to some displaced plane 76, FIGURE 5. The action of the discs 64 is to push the trailing ends 58 forwardly from displaced plane position 76, FIGURE 5, to the aligned plane position 74 to maintain the respective short tube 42 in proper alignment to be properly severed by the knife blade 70.

The spacing of each respective knife member 60 and disc 64 is equal to a short tube length between ends 56 and 58.

This leftward pushing action of disc 64 is produced by a spring 78, which pushes the disc 64 leftward in FIGURE 5 in a manner more fully elsewhere described. A spring construction 80, which is stronger than spring 78, maintains the cutting knife member 60 and its blade 70 against the stationary disc or flat surfaced support member 68 and consequently also maintains the leading edge of the short tube in the plane 72.

The stationary cutting blades or anvils 66 are spaced from each other around the periphery 46 of the wheel so they are equal to the length of a short tube 42 along the inner part 52 of the arch. The long tube 32 is bent at these anvils 66 to form the polygonal arch around portion 51 of the rotating wheel 44.

Each pair of a cutting knife 60 and rotating disc 64 is carried by a casing 82 which is secured to the wheel 44 by bolt constructions or by welding or the like, not shown, and as elsewhere more fully described.

Alternate casings 82 are placed on opposite sides of the wheel, so that the respective anvils 66 may be placed sufficiently close together to cut the relatively short tubes 42 at proper length.

Figure 11:
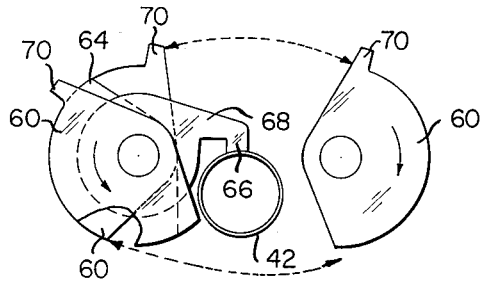
FIGURES 11 through 22 are a series of diagrammatic illustrations showing the relative positions of the knives and discs at successive stages of rotation along the polygonal arch where the long tube contacts the periphery of the wheel.

The construction is such that a respective casing 82 is adjacent the short tube 42 at the beginning point 84 of the arch 51, FIGURE 1A. At that time, the respective cutting knife member 60, blade 70, and the rotating disc 64 have a relative position, with respect to the adjacent short tube 42, as indicated in FIGURE 11. As the wheel 44 rotates clockwise in FIGURE 1A, the cutting member 60, blade 70 and rotating disc 64, which was shown in FIGURE 11, gradually rotate, as indicated in FIGURES 12 through 22, until substantially at the end of the arch 51, as indicated at 86, FIGURE 1A, the cutting blade 70 is adjacent the stationary cutter blade 66 and is about to sever the uncut strip 40 of the long tube 32. The immediately preceding or forward short tube 30 is then free to be moved, as shown at 30, in FIGURE 1A, by the discharge conveyor belts 88, to be carried on the supports 90 and to a storage compartment or place of use, or place of distribution 92. Such short tubes 30 may be provided with end covers to serve as containers. They may also be used for other purposes, with or without such end covers, or with only one end cover, as desired.

A vacuum system is effective to hold the short tubes 42 against the periphery 46 of the wheel 44 from the time that such short tubes 42 enter the beginning of the arch 51 at 84 and such vacuum system is maintained to act upon the short tubes until just after the tubes 42 pass beyond the discharge end 86 of the arch 51. At that time the vacuum system becomes ineffective and an air pressure system becomes effective to blow the severed tube 30 slightly away from the wheel 44.

The vacuum system may include a central vacuum hollow shaft 94, FIGURE 9, which is stationary and which is connected by the passageway 96, FIGURES 9 and 10, to a distributing channel 98, which channel 98 extends along the periphery of the stationary end member 100, which is sealed at 101 and is secured to the end of the shaft 94 by a bolt construction or the like 102. The channel 98 connects with the radial passageways 104 in the outer cover member 106 of the wheel 44. The radial passageways 104 connect with the passageways 108, 110, 112, and with the nozzle-like construction 114, which applies the vacuum to the short tubes 42 while they travel within the arch 51. This vacuum holds the tubes 42 against the periphery 46 of the wheel. These same passageways 104, 108, 110, 112, and the nozzle-like construction 114 may be connected to the air pressure channel 116 to apply air pressure to the nozzle 114 from the air pressure supply 118, which may be connected to the end piece 100 at any suitable place, such as indicated in FIGURE 9.

FIGURE 10 is shown from the opposite side of the wheel 44, as compared to the side from which the other views, such as FIGURES 1, 4, 8, etc., are viewed.

The wheel construction 44 may be mounted on a rigid stationary base construction 116, on which the stationary vacuum shaft 94 is also mounted beyond the left end of FIGURE 9. A rotary shaft construction 48 is placed around the stationary shaft 94 and may be integral with or may be connected with the main body of the wheel construction 44. Suitable bearings, such as 118 and 120, can be provided for the rotary shaft 48.

*Drive for the rotary knives 60 and rotary discs 64*

The rotary knives 60 and the rotary discs 64 may be rotated about their respective axes 62 by any suitable means.

For example, a stationary gear 122 may be carried by the stationary shaft 94. This gear is engaged by a planetary gear 124, FIGURES 8 and 9, which is rotatable about the shaft 126, which shaft in turn may be threaded into the support structure 128 of the wheel 44. The planetary gear 124, in turn, engages an outer planetary gear 130 which is fixed on a shaft 132. The rotary shaft 132 may be fixed to a worm gear 134 which in turn rotates the gear 136, which is fixed to the knife and disc driving shaft 138, FIGURE 5.

Each respective shaft 138 is rotatably free but axially fixed within its respective casing 82 by means of the bearing race or the like 140, FIGURE 5, and may be suitably and firmly supported within the casing 82 by another bearing race 142. Any other suitable and well known construction for holding the shaft 138 firmly against axial movement and free for rotation may be provided, as is generally indicated in FIGURE 5.

The rotary knife member 60 is axially slidable on the shaft 138 by the key construction 144 and the bearing construction 146. Likewise, the disc 64 is rotationally fixed on the shaft 138 by the key construction 150, but axially free to move by means of the bearing construction 148.

The disc 64 is provided with an annular cam construction which has a leftward extension 152 at the upper part. This extension 152 engages the roller 154 when the particular casing 82 is entering the end 84 of the arch 51, FIGURE 1A. This momentarily holds the disc 64, rightward in FIGURE 5 so that it is made certain that the disc 64 will be to the right of the trailing end 58 of the short tube 42. When the cam 152 has passed out of engagement with the roller 154, the disc 64 is pushed leftwardly by the spring 78, in FIGURE 5, which tends to push any laggard tube construction leftward from the laggard plane 76 to the plane 74, so as to bring the long tube construction 32 into proper alignment with the cutting knife 60, to insure a clean and aligned cut between the two slit edges 36 and 38 of tube 32, FIGURE 2.

It is to be noted that all of the disc 64 constructions which are momentarily within the arch zone 51 may act substantially in unison to give the long tube 32 a forward push by the combined actions of springs 78. This will bring the apexes 59' of the divergent angles 59 back into alignment with the cutting planes 72 so a clean cut is provided between short tubes 42.

The gear ratios between the gears 122, 124, 130, 134, and 136 are such that the knife and disc constructions 60 and 64 are properly timed so each disc 64 enters substantially at the arch position 84 of FIGURE 1A and so each cutting blade 70 cuts the uncut strip 40 substantially when such blade 70 reaches the arch position 86 of FIGURE 1A. The various positions of such knife and disc as they travel along the arch 51 between positions 84 and 86 are shown in FIGURES 11 through 21.

While any particular group, composed of a knife 60, a disc 64, and a short tube 42, travels from position 84 to 86, the vacuum system is applied, at a respective nozzle 114 as previously described, to hold the respective short tube 42 firmly against the periphery 46 of the wheel while it travels along the length of arch 51. The air pressure system is thereafter applied at nozzle 114 immediately after the short tube 42 passes the point 86, FIGURE 1A, to free the severed short tube 30 from the wheel and to discharge it on the conveyor system 88.

The knife construction 60 shown at the right sides of FIGURES 11 through 21 show the relative position of the next trailing knife construction which trials the knife 60 on the lefthand sides of FIGURES 11 through 21. In general, it may be said that the adjacent knives 60 trail each other with a 30° rotary angle, while the wheel 44 travels 110° from the position 84 to the poistion 86.

The following are typical conditions prevailing during the actions of FIGURES 11 through 21:

In FIGURE 11, wheel 44 is 110° before the cutoff at FIGURE 22, the lefthand knife blade 70 is 220° before cutoff, and the vacuum is off, but will be almost immediately turned on. The righthand knife blade 70 of FIGURE 11 may trail the righthand blade by 30° with respect to the lefthand cutter 60.

In FIGURE 12, wheel 44 is 100° from cutoff at FIGURE 22, lefthand blade 70 is 200° before cutoff, and a partial vacuum has been applied to the short tube 42.

In FIGURES 13 through 22, the wheel 44 advances 10° as each figures is shown, and the lefthand knife blade 70 rotates 20° between figures. A partial vacuum is applied at FIGURE 13, an increased vacuum at FIGURE 14, and a complete vacuum is applied at FIGURES 15 through 22. At FIGURE 22 the wheel 44 is at zero, the knife blade 70 is at zero, and the vacuum is still on. However, immediately after the position of FIGURE 22, the forward short tube 30 of FIGURE 1A is cut off, the vacuum is turned off and the air pressure is that on to blow the forward short tube 30 away from the wheel 44.

*Construction of wheel 44*

The rotary wheel drive and support shaft 48 may be driven from a drive gear 156 which may be driven by any suitable power source, which is synchronized with the output of apparatus 172, FIGURE 1, so the tubes 42 are correctly placed on the wheel 44 substantially correctly to position the cuts between the tubes 42. The gear 156 engages the gear 158 which is rotationally keyed on the rotary shaft 48.

The periphery 46 of wheel 44 may be made of arc-shaped members 160, FIGURES 9 and 10, which receive the nozzle construction 114 at their valleys. A set of inward transverse slots 162 are cut into the wheel 44 to permit rotation of the respective knives 60 and discs 64 which rotate in these slots 162. The relation of these slots 162 with respect to the respective casings 82 which contain the knives and discs is such that one set of slots 162 is dispaced with respect to other sets of slots 162A and 162B, so as to a accommodate the next adjacent casings 82, not shown, in FIGURE 8.

Each shaft construction 132 and gear 134, etc., FIGURE 9, may be serviced through a respective removable cover 164, which is bolted at 166 to the respective casing 82. Each shaft 132 passes through a respective opening 167 in wheel 44 and 169 in casing 82.

This invention is particularly applicable to a tube construction 32 which is made of relatively thin aluminous sheet material 170, FIGURE 1. This sheet material may be made of any suitable material, such as commercially pure aluminum or any suitable aluminum alloy. The sheet material 170 may have labels for each short tube 42 preprinted thereon, and, if desired, it may be passed through a strip punching and slitting and tube forming machine assembly 172 which makes the slits 34, with the openings 36 and 38 at the ends of the slits 34, and then bends the strip 170 into the tube 32 with a longitudinal butt-welded seam at 40. This construction or assembly 172 may be made to register the slits 34 with the preprinted labels on the strip. However, the printing may be performed after the tubes have been severed in the apparatus of this invention, if desired.

The wheel construction 44 is of such a character that it automatically adjusts or aligns itself to produce a clean cut in strip 40 substantially in alignment with the slit 34 and between the openings 36 and 38. The plurality of discs 64, which are acting in unison on all of the short tubes 42 which lie between the positions 84 and 86 provides a sufficient pull on the tube 32 so such tube 32 is pulled forward from an unaligned position 76 to the aligned position 74, FIGURE 5, so that clean cuts are produced at the apexes 59' of the diverging angles 59, FIGURES 1A and 4, between the various uncut tubes 42.

The tube 32 is fed or passes through the feeding means 50. The feeding means may be in the form of a loose belt 180 which passes over the pulleys 182 and 184 within a trough-like member 186. The trough member 186 may be provided with two side guides 188 to maintain the tube 32 in alignment. The pulleys 182 and 184 are so powered that the lower run of the belt 180 is kept in tight condition and the upper run of the belt is maintained in drooping or sagging condition. For example, a slight drag or braking action may be provided for pulley 182 and turning power may be applied to pulley 184. Preferably the apparatus 50 near the pulley 184 is mounted on a stationary stand 190 while the portion of the apparatus near the pulley 182 is mounted adjacent to the adjustable jack or support 192, so the level of the tube 32 where it engages the wheel construction 44 may be adjusted. The sagging condition of the upper run 181 of the belt 180 permits the tube 32 to be adjusted with respect to the periphery of the wheel 44 so the proper spacing of the slits 34 may be adjusted from the unaligned planes, such as 76 of FIGURE 5, to the correct alignment planes 74 as previously described. The thickness of the metal strip 170 is such that the tube 32 formed from such strip 170 can slide forward a sufficient amount over the edges of the stationary cutting blades 70 so that the tube 32 is brought into correct timed relationship without the necessity of any electric eye or the like.

The rise of the tube 32 from its entrance into the feed means 50 to its entrance into the periphery of the wheel is approximately 15°, and the length of the feed means 50 is preferably made so that the belt 80 supports between six and seven short tubes, which is sufficient to provide the necessary sag and adjustment for the necessary take-up in the tube.

The nozzle construction 114, FIGURES 10 and 10A, may extend longitudinally of the respective short tube 42 to provide a vacuum space where the longitudinal uncut strip 40 is not touched by the wheel construction. The vacuum applied at this point maintains the adjacent short tube 42 tightly against the periphery of the wheel.

The nozzle construction 114 may be provided with transverse slots 114a to spread and apply the vacuum to side portions of the adjacent short tube 42.

In FIGURES 11–22, the right-hand knife construction 60, 70 is shown in displaced mirror-image condition in order to avoid cluttering these views.

However, in FIGURE 11, the right-hand knife construction 60, 70 has also been drawn in its correct position on the left side of FIGURE 11. The trailing knife construction 60, 70, behind the forward knife 60, 70, as shown on the left side of FIGURE 11, is the identical construction which is also shown in mirror image on the right side of FIGURE 11. This relationship has been indicated by the dotted arrows and connecting lines in FIGURE 11. The double showing of FIGURE 11 has not been repeated in FIGURES 12–22.

It is thus to be seen that an improved method and apparatus has been provided to produce a long tube 32 transversely slitted at 34, and to cut said tube into a plurality of short tubes 30 equal in length to the distance between such transverse slits 34.

The long tube 32 is automatically fed on to a rotating wheel 44 in a manner to produce a polygonal arch on the wheel 44 formed by the sides of the uncut short tubes 42. The ends of these short tubes 42 form diverging angles 59 into which the plurality of cutting knives 60, 70 enter and correctly cut the uncut strip 40 at the proper time.

A plurality of discs 64 engage the trailing ends of the uncut short tubes 42 and automatically advance the long tube 32 on the wheel if such long tube 32 should lag from its correct position on the wheel 44.

Vacuum means automatically hold the arched tubes 42 on the wheel 44, and compressed air means automatically blow the cut tubes 30 from the wheel 44.

The supports 90, which are shown in cross section in FIGURE 2 may be "air greased." They may be made in hollow form, as shown. Compressed air may be fed into the supports 90, and this compressed air is allowed to escape through properly positioned openings 90'. The escaping air produces a slight lifting action on the short tubes 30 so they are "air greased" as they travel along the supports 90.

Other improvements are provided.

While the form of the invention now preferred has been disclosed as required by statute, other forms may be used, all coming within the scope of the claimed subject matter which follows.

What is claimed is:

1. The method of completely severing relatively short tubes from a relatively long tube having a plurality of transverse slits extending to and terminating at both edges of an uncut longitudinal strip of said tube which strip holds together a series of partially severed, relatively short, tubes which form said long tube, which method comprises: feeding and bending said long tube around a portion of the periphery of a rotating wheel with said uncut longitudinal strip forming the inner part of a polygonal arch formed by the straight sides of said short tubes, and with the ends of adjacent short tubes diverging from each other; rotating a cutting knife carried by said wheel completely around an axis parallel to an adjacent short tube with said knife rotating adjacent the leading end of said adjacent short tube; and causing said knife to cut said longitudinal strip adjacent said leading end of said adjacent short tube completely to sever, from said long tube, the forward short tube which is immediately forward of said adjacent short tube, and in which a disc is simultaneously rotated about said axis adjacent the trailing end of said adjacent short tube and in which said disc has means to cooperate with said cutting knife automatically to align the portion of said longitudinal strip which connects said adjacent short tube to said forward short tube with said knife.

2. The method of completely severing relatively short tubes from a relatively long tube having a plurality of transverse slits extending to and terminating at both edges of an uncut longitudinal strip of said tube which strip holds together a series of partially severed, relatively short, tubes which form said long tube, which method comprises: feeding and bending said long tube around a portion of the periphery of a rotating wheel with said uncut longitudinal strip forming the inner part of a polygonal arch formed by the straight sides of said short tubes, and with the ends of adjacent shorts tubes diverging from each other; rotating a cutting knife carried by said wheel completely around an axis parallel to an adjacent short tube with said knife rotating adjacent the leading end of said adjacent short tube; and causing said knife to cut said longitudinal strip adjacent said leading end of said adjacent short tube completely to sever, from said long tube, the forward short tube which is immediately forward of said adjacent short tube, and in which a plurality of knives similar to said knife are rotated about respective axes parallel to respective adjacent short tubes located on said wheel, and in which a plurality of discs are simultaneously rotated about said respective axes adjacent the respective trailing ends of said respective short tubes and in which said discs have means to cooperate with said knives automatically to align the respective portions of said longitudinal strip which connect respectively said adjacent short tubes respectively to said forward short tubes with said respective knives.

3. A method according to claim 2 in which alternate pairs of said cooperating knives and discs are rotated on opposite sides of said wheel.

4. The method of completely severing relatively short tubes from a relatively long tube having a plurality of transverse slits extending to and terminating at both edges of an uncut longitudinal strip of said tube which strip holds together a series of partially severed, relatively short, tubes which form said long tube, which method comprises: feeding and bending said long tube around a portion of the periphery of a rotating wheel with said uncut longitudinal strip forming the inner part of a polygonal arch formed by the straight sides of said short tubes, and with the ends of adjacent short tubes diverging from each other; rotating a cutting knife carried by said wheel completely around an axis parallel to an adjacent short tube with said knife rotating adjacent the leading end of said adjacent short tube; and causing said knife to cut said longitudinal strip adjacent said leading end of said adjacent short tube completely to sever, from said long tube, the forward short tube which is immediately forward of said adjacent short tube, and in which a plurality of knives similar to said knife are rotatable about respective axes parallel to respective adjacent short tubes located on said wheel, and in which automatic alignment is provided to align each respective portion of said longitudinal strip which connects each respective adjacent short tube with its respective forward short tube with each respective knife, and in which a plurality of discs are rotatable about said respective axes adjacent the trailing ends of said respective short tubes automatically to align the respective portions of said longitudinal strip which connect said respective adjacent short tubes to said respective forward short tubes with each respective knife.

5. The method of completely severing relatively short tubes from a relatively long tube having a plurality of transverse slits extending to and terminating at both edges of an uncut longitudinal strip of said tube which strip holds together a series of partially severed, relatively short tubes which form said long tube, which method comprises: feeding and bending said long tube around a portion of the periphery of a rotating wheel with said uncut longitudinal strip forming the inner part of a polygonal arch formed by the straight sides of said short tubes, and with the ends of adjacent short tubes diverging from each other; moving a cutting knife adjacent one end of an adjacent short tube to cause said knife to cut said longitudinal strip adjacent said one end completely to sever, from said long tube, the forward short tube which is immediately forward of said adjacent short tube; and simultaneously providing automatic alignment of the portion of said longitudinally strip which connects said adjacent short tube to said immediately forward short tube with said knife, and using a flat surfaced member adjacent the other end of said adjacent tube to provide said automatic alignment.

6. Apparatus for completely severing relatively short tubes from a relatively long tube having a plurality of transverse slits extending to and terminating at both edges of an uncut longitudinal strip of tube which strip holds together a series of partially severed, relatively short tubes which form said long tube, which apparatus comprises: a wheel having a periphery to receive said tube; means for rotating said wheel; means for feeding and bending said long tube around a portion of said periphery of said wheel, while said wheel is rotating, with said uncut longitudinal strip forming the inner part of a polygonal arch formed by the straight sides of said short tubes, and with the ends of adjacent short tubes diverging from each other; a cutting knife carried by said wheel having means completely to rotate said knife around an axis parallel to an adjacent short tube with said knife rotating adjacent the leading end of said adjacent short tube, said knife cutting said longitudinal strip adjacent said leading end of said adjacent short tube completely to sever, from said long tube, the forward short tube which is immediately forward of said adjacent short tube.

7. Apparatus for completely severing relatively short tubes from a relatively long tube having a plurality of transverse slits extending to and terminating at both edges of an uncut longitudinal strip of said tube which strip holds together a series of partially severed, relatively short tubes which form said long tube, which apparatus comprises: a wheel having a periphery to receive said tube; means for rotating said wheel; means for feeding and bending said long tube around a portion of said periphery of said wheel, while said wheel is rotating, with said uncut longitudinal strip forming the inner part of a polygonal arch formed by the straight sides of said short tubes, and with the ends of adjacent short tubes diverging from each other; a cutting knife carried by said wheel having means completely to rotate said knife around an axis parallel to an adjacent short tube with said knife rotating adjacent the leading end of said adjacent short tube, said knife cutting said longitudinal strip adjacent said leading end of said adjacent short tube completely to sever, from said long tube, the forward short tube which is immediately forward of said adjacent short tube, said apparatus being provided with a disc having means simultaneously to rotate said disc about said axis adjcent the trailing end of said adjacent short tube and in which said disc has means to cooperate with said cutting knife automatically to align the portion of said longitudinal strip which connects said adjacent short tube to said forward short tube with said knife.

8. Apparatus for completely severing relatively short tubes from a relatively long tube having a plurality of transverse slits extending to and terminating at both edges of an uncut longitudinal strip of said tube which strip holds together a series of partially severed, relatively short tubes which form said long tube, which apparatus comprises: a wheel having a periphery to receive said tube; means for rotating said wheel; means for feeding and bending said long tube around a portion of said periphery of said wheel, while said wheel is rotating, with said uncut longitudinal strip forming the inner part of a polygonal arch formed by the straight sides of said short tubes, and with the ends of adjacent short tubes diverging from each other; a cutting knife carried by said wheel having means completely to rotate said knife around an axis parallel to an adjacent short tube with said knife rotating adjacent the leading end of said adjacent short tube, said knife cutting said longitudinal strip adjacent said leading end of said adjacent short tube completely to sever, from said long tube, the forward short tube which is immediately forward of said adjacent short tube, and in which apparatus a plurality of knives similar to said knife are provided with means to rotate said knives about respective axes parallel to respective adjacent short tubes located on said wheel, and in which apparatus a plurality of discs are provided with means simultaneously to rotate said discs about said respective axes adjacent the respective trailing ends of said respective short tubes and in which said discs have means to cooperate with said knives automatically to align the respective portions of said longitudinal strip which connect respectively said adjacent short tubes respectively to said forward short tubes with said respective knives, and in which alternate pairs of said cooperating knives and discs are rotated on opposite sides of said wheel.

9. Apparatus for completely severing relatively short tubes from a relatively long tube having a plurality of transverse slits extending to and terminating at both edges of an uncut longitudinal strip of said tube which strip holds together a series of partially severed, relatively short tubes which form said long tube, which apparatus comprises: a wheel having a periphery to receive said tube; means for rotating said wheel; means for feeding and bending said long tube around a portion of said periphery of said wheel, while said wheel is rotating, with said uncut longitudinal strip forming the inner part of a polygonal arch formed by the straight sides of said short tubes, and with the ends of adjacent short tubes diverging from each other; a cutting knife carried by said wheel having means completely to rotate said knife around an axis parallel to an adjacent short tube with said knife rotating adjacent the leading end of said adjacent short tube, said knife cutting said longitudinal strip adjacent said leading end of said adjacent short tube completely to sever, from said long tube, the forward short tube which is immediatly forward of said adjacent short tube in which a plurality of knives similar to said knife are provided with means to rotate said knives about respective axes parallel to respective adjacent short tubes located on said wheel and adjacent the leading ends of said respective short tubes and in which means are provided automatically to align each respective portion of said longitudinal strip which connects each respective adjacent short tube with the forward short tube immediately forward of said each respective adjacent short tube with each respective knife and including a plurality of shafts rotatably fixed and axially free with respect to said each respective knife, and in which a plurality of discs are mounted on said wheel and rotate about said respective axes adjacent the trailing ends of said respective short tubes automatically to align the respective portions or said respective adjacent short tubes to said respective forward short tubes with each respective knife and in which respective shafts rotate about said respective axes and are rotatably secured to and axially free with respective pairs of said knives and discs and in which respective spring means are provided for each of shafts axially to align said respective pairs of knives and discs with respective leading and trailing ends of said short tubes.

10. Apparatus for completely severing relatively short tubes from a relatively long tube having a plurality of transverse slits extending to and terminating at both edges of an uncut longitudinal strip of said tube which strip holds together a series of partially severed, relatively short tubes which form said long tube, which apparatus comprises: a wheel having a periphery to receive said tube; means for rotating said wheel; means for feeding and bending said long tube around a portion of said periphery of said wheel, while said wheel is rotating, with said uncut longitudinal strip forming the inner part of a polygonal arch formed by the straight sides of said short tubes, and with the ends of adjacent short tubes diverging from each other; a cutting knife movable adjacent one end of an adjacent short tube to cause said knife to cut said longitudinal strip adjacent said one end completely to sever, from said long tube, the forward short tube which is immediately forward of said adjacent tube; and means simultaneously providing automatic alignment of the portion of said longitudinal strip which connects said adjacent short tube to said immediately forward short tube with said knife and including means to move a plurality of knives similar to said knife adjacent one end of respective adjacent short tubes and having a plurality of flat surfaced members adjacent the other ends of said respective tubes having means providing automatic alignment to align the respective portions of said longitudinal strip which connect each respective short tube with its respective forward short tube with said plurality of knives, and in which alternate pairs of said knives and said flat surfaced members are on opposite sides of said wheel.

References Cited by the Examiner
UNITED STATES PATENTS

| | | | |
|---|---|---|---|
| 1,799,236 | 4/1931 | Hunt | 83—907 X |
| 1,817,996 | 8/1931 | Maltby | 83—337 X |
| 1,917,806 | 7/1933 | Miller | 83—337 X |
| 2,369,551 | 2/1945 | Feiler | 83—228 X |
| 2,383,523 | 8/1945 | Thornburgh | 83—323 X |
| 2,984,138 | 5/1961 | Vitense et al. | 83—337 X |
| 2,997,904 | 8/1961 | Gotsch et al. | 83—165 X |
| 3,114,282 | 12/1963 | Reifenhouser et al. | 83—592 X |

WILLIAM W. DYER, JR., *Primary Examiner.*

ANDREW R. JUHASZE, *Examiner.*